W. HARRIS.
Stereoscopic Cameras.
No. 151,973. Patented June 16, 1874.
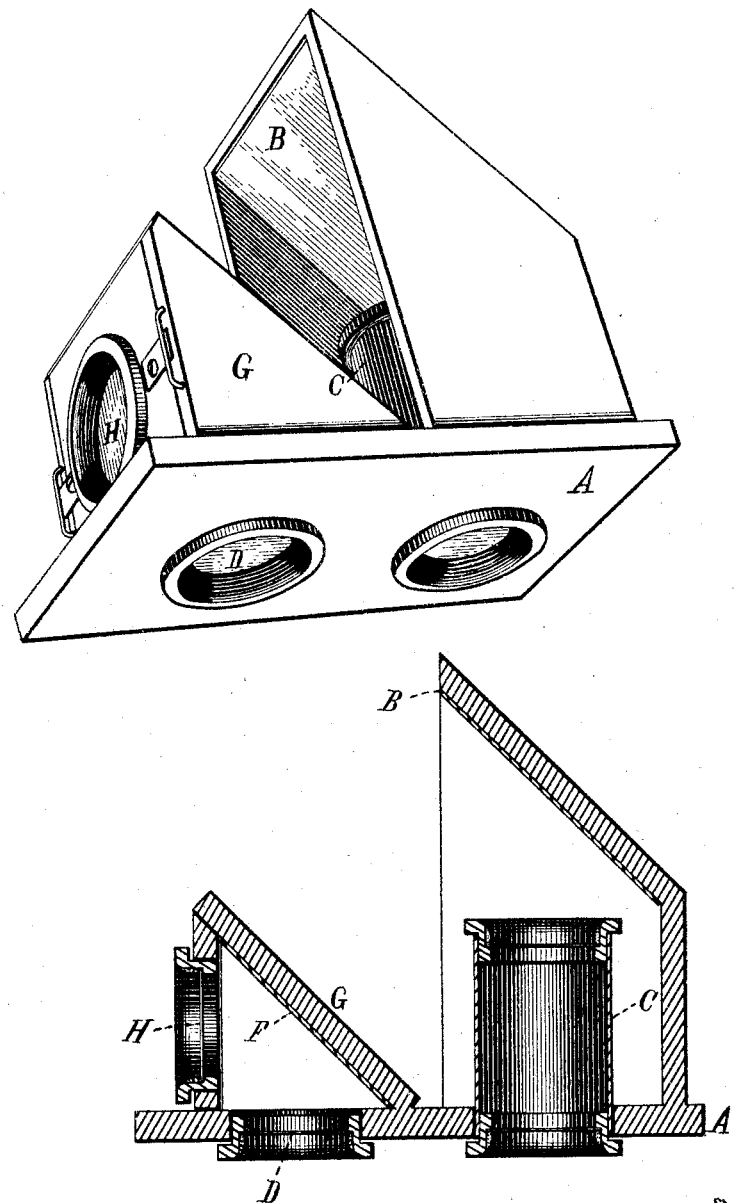
Witnesses,
Inventor,
Warren Harris

UNITED STATES PATENT OFFICE.

WARREN HARRIS, OF DANVILLE, VERMONT.

IMPROVEMENT IN STEREOSCOPIC CAMERAS.

Specification forming part of Letters Patent No. 151,973, dated June 16, 1874; application filed February 3, 1874.

CASE A.

*To all whom it may concern:*

Be it known that I, WARREN HARRIS, of Danville, in the county of Caledonia and State of Vermont, have invented a certain Improvement in Stereoscopic Cameras, of which the following is a specification:

The object of my invention is to take positive or negative stereoscopic portraits and views which shall not require transposition, by the combination of two reflectors with the two double combination object-glasses of a stereoscopic camera, in such a manner as to cause the light to form each of the two images without causing the rays which form one image to cross those which form the other after reflection.

A is the front board of a stereoscopic camera. C is a double combination object-glass in the usual position, with a reflector, B, in front of it, fixed in a hood at an angle of about forty-five degrees with the sensitive plate. The hood may be attached to the lens-tube or to the front board. The two lenses of the other object-glass are taken out of the tube, and the back lens D inserted in the front board at a distance from the object-glass C corresponding nearly with the distance between the two eyes. In front of the lens D is a hood, G, in which a reflector, F, is placed at an angle of forty-five degrees with the lens D. The front lens H is inserted in a piece of wood or metal, which is made to fit in the open part of the hood, and at right angles with the lens D. The two lenses D H should be placed at such distance from each other that the light will travel the same distance between the two lenses that it would if the lenses were in the tube.

The mode of operation is as follows: The camera is placed within the sensitive plate parallel with the principal ray of light. The light from the object passes directly through the lens H, striking the reflector F, which reflects it through the lens D onto the sensitive plate in a laterally uninverted position, forming the left-hand image. The light which strikes the reflector B is reflected through both of the lenses of the object-glass C, forming the right-hand image.

Since the light which forms one image travels five or six inches farther than that which forms the other, in taking portraits lenses of different focal lengths are required. If the image is one-twelfth the size of the object, one lens should be one-half inch longer focus than the other; if one-twenty-fourth the size, one-fourth inch; if one-forty-eighth, one-eighth inch, &c. The focus of one lens may be lengthened by putting a slightly concave lens between the two combinations.

To take negatives the film should be turned away from the lenses.

I claim as my invention—

The combination, in a stereoscopic camera, of a double combination object-glass having a reflector before it with an object-glass in which the two lenses are placed at right angles to each other, and have a reflector behind the front and before the back lens, substantially as described, for the purpose of obviating the necessity for transposition.

WARREN HARRIS.

Witnesses:
RUFUS AMES,
EMERSON GUE.